J. FARRELL.
MACHINE FOR MAKING ELECTRIC CABLES.
No. 10,402. Reissued Nov. 6, 1883.
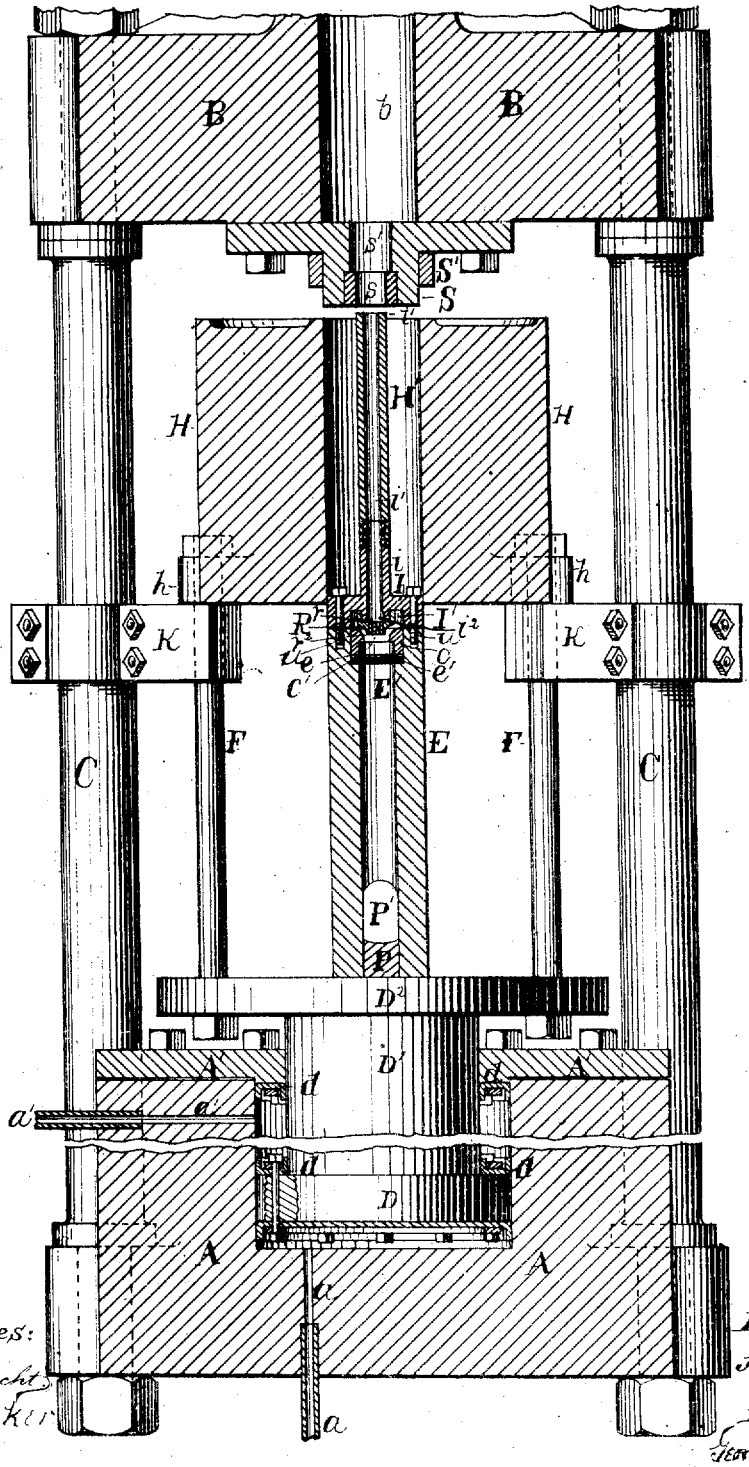
Witnesses:
T. C. Brecht
C. L. Parker
Inventor:
John Farrell,
By Attorney.
George H. Christy

UNITED STATES PATENT OFFICE.

JOHN FARRELL, OF PITTSBURG, PENNSYLVANIA.

MACHINE FOR MAKING ELECTRIC CABLES.

SPECIFICATION forming part of Reissued Letters Patent No. 10,402, dated November 6, 1883.

Original No. 262,027, dated August 1, 1882. Application for reissue filed September 29, 1882.

DIVISION B.

*To all whom it may concern:*

Be it known that I, JOHN FARRELL, a citizen of the United States, residing at Pittsburg, in the county of Allegheny, State of Pennsylvania, have invented or discovered a new and useful Improvement in Machines for Making Electric Cables; and I do hereby declare the following to be a full, clear, concise, and exact description thereof, reference being had to the accompanying drawing, making a part of this specification, in which, like letters indicating like parts, my improved machine is illustrated by a view in sectional elevation.

My invention relates to certain improvements in machines for covering electric circuit-wires with a body of lead, and more particularly to that class of machines embodying the well-known principles of construction and operation employed in lead-pipe machines. Such machines usually consist of a hydraulic cylinder and piston for imparting power and motion, a cylinder for containing the lead, a die and core for forming the pipe-like article, and a ram or plunger for forcing the lead out of its cylinder through the die; and when employed for covering wires with lead a hollow core has been used for spacing the wires (two or more) while the lead covering is formed on them.

This division or part of my invention consists in a new and improved construction and combination of the parts of such a machine as shown in the drawing, and as hereinafter more fully described and claimed.

To a hydraulic cylinder, A, is secured a cross-head, B, by columns or bolts C, these parts constituting a frame-work by which the remaining parts of the machine are supported. The cylinder A is provided with a piston, D, and piston-stem D′, of size and strength adapted to the class of work referred to. The upper end of this cylinder is closed by a head, A′, through which the piston-stem passes, and this head, as well as the two faces of the piston, is packed with cups *d*, to prevent leakage. Ports *a a′* are provided at or near the opposite ends of the cylinder for water supply and exhaust from any suitable hydraulic press. These ports may be controlled by valves, substantially as in steam-engines, or in other suitable way whereby the piston may be operated both ways by water-pressure. I do not deem it necessary to show such valves and power apparatus, as such devices are well known for kindred purposes; and, instead of hydraulic, steam or other power may be employed for actuating the piston in acccordance with well-known principles.

On the upper end of piston-stem D′ is fixed a platen, $D^2$, which carries a tubular ram or plunger, E, and lead cylinder H, the latter b ing connected with the platen by bolts F, in any desired number, which pass loosely through lugs *h*, and also through brackets K, which are secured on the columns C, and serve both as guides to direct the bolts F, as the platen is moved, and as supports to sustain the cylinder H or prevent it from descending below a certain point.

In a socket, *e*, formed in the plunger at the upper end of its tubular passage E′, is seated a die, *c*, having a die-opening, *c′*, therein corresponding in form to the desired exterior form of the cable or conductor. This die is adjusted vertically by liners *e′*, in any desired number. Pressure of lead upon the die is downward. Consequently it will be held to its seat thereby.

Seated upon the end of plunger E, immediately above the die *c*, is a mandrel head or support, I, carrying a hollow stem, *i*. Openings in any desired number are provided on either side of the stem *i*, to permit passage of lead from the chamber H′ to the under side of the head, and to die *c*. I prefer to make the upper part or body of this head of proper size to fit closely within the lead-chamber H′, and it is fastened by bolts *u* to the end of the plunger, so as to prevent lead from entering between its under face and its seat, thereby disturbing the accuracy of adjustment required between the die and mandrel. A chamber, I′, is made in the under face of this head, directly over the die *c*, and on a threaded pipe-like projection, $i^2$, is screwed a hollow mandrel, R. The threaded socket *r* of this mandrel is, by preference, made cylindrical, and its lower end or point is reduced to a form corresponding to the die-opening *c′*. In the lower extremity of this mandrel are made perforations $r^2$, through which the electric conducting-wires to be covered with lead are passed. These perforations may be of any desired number corresponding to the number of wires required therein. On the exterior surface of the mandrel, between perforations, may be made grooves or corrugations increasing in depth toward the extremity, the purpose of which is to give direction to the flow of lead past the mandrel into the spaces between wires, thereby affording an unbroken wall or body of lead between and around each wire when such form of product is desired. I make no claim, however, in this division of my application to the construction and combination of the die, mandrel, and mandrel-head, alone considered, as they are included in the subject-matter of Division A of this reissue. The tubular stem *i*, through which the wires are carried to the mandrel, is extended by a pipe, *i'*, upward through the lead-chamber H'. A tubular ram or plunger, S, adapted in form to enter and fill closely the end of chamber H', is rigidly bolted to the cross-head B, with its central passage, *s'*, in line with the pipe *i'* below and the hole *b* above through the cross-beam. The passage thus provided to and through the mandrel may be used not only for inserting wires, as stated above, but also as a receptacle for insulating material with which to coat or cover the wires.

In the lower end of ram S is seated a die, *s*, adapted to receive and fit closely upon the pipe *i'*, so as to prevent escape of lead between the die and pipe. Above the die the passage *s' b* may be somewhat larger than the pipe, thereby confining friction-surface to the bearing of the die.

In the operation of this machine the wires are passed downward through the perforations $r^2$ into the passage E'. The platen $D^2$ is lowered until the cylinder H rests upon the brackets K, with the mandrel-head I closing the lower end of the lead-chamber H', and with an open space between the upper end of this chamber or cylinder and the ram S. The chamber is then filled with molten lead, and while the charge is still hot—say as soon as it is set—power is applied to raise the piston D, and with it the plunger E. In practice the lead moves in the chamber with considerable friction, enough to support and carry with it the cylinder, unless the latter be held by other means. Consequently as the plunger is raised the cylinder with the lead therein will be raised until the upper plunger or ram, S, enters the chamber. The further upward movement of the cylinder will then be arrested by the friction incident to displacing the lead therein; or stops S' or other suitable means may be employed for this purpose. Further upward movement of plunger E will cause the lead to flow or exude, under pressure, from the lower end of the chamber downward around the mandrel and through the die, where it is applied as a covering to the wires. In this operation the main body of lead within the chamber is stationary, that part only being moved which is adjacent to the advancing head I, and one special advantage secured is in reducing friction, which would result from moving the entire body of lead, under pressure, through the cylinder. When the charge is thus pressed out, the piston D is lowered and the rods F or the friction of head I in the cylinder will draw the latter downward onto the guide and supporting-brackets K sufficiently below the ram S to permit of easy filling for another operation. By using dies and mandrels of suitable form conductors of various forms may be made, either flattened or more or less cylindrical. As such conductor is formed in the machine it is passed downward through the passage E', and, being deflected by block P or other suitable device placed in such passage, it is discharged laterally through side opening, P'. As it emerges from this opening it may be wound on a reel, ready for use, or other disposition may be made of it, as desired.

I claim herein as my invention—

1. In a machine for making lead-covered electric conductors, the combination of vertically-movable plunger E, stationary ram S, in line with the plunger, and cylinder H, vertically movable in the line of the plunger and ram, substantially as set forth.

2. The combination of plunger E, die *c*, and adjusting-liners *e'*, in any desired number, between the die and its seat, substantially as set forth.

3. The combination of plunger E, mandrel-head I, mandrel R, die *c*, and liners *e'*, substantially as set forth.

4. The tubular plunger E, having a die-socket, *e*, therein at the upper end of its tubular passage, in combination with die *c* and adjusting-liners *e'*, substantially as set forth.

5. The combination of plunger E, mandrel-head I, such head being bolted to the end of the plunger, mandrel R, and die *c*, substantially as set forth.

6. In combination with the vertically-movable cylinder H, a stationary tubular ram, S, secured above and in line with the cylinder-chamber, a tubular plunger, E, below and in line with such chamber and vertically movable independent of the cylinder, die *c*, mandrel R, and mandrel-head I, the latter having a tubular stem extending from the mandrel through the cylinder-chamber in line with the tubular passage in the ram, substantially as set forth.

7. In combination with the cylinder H, a fixed ram, S, secured above and adapted to enter the cylinder-chamber, a movable plunger, E, adapted to enter such chamber from below, with a mandrel and shaping-die seated on the end of such plunger and movable therewith, brackets K, bolts F, and platen $D^2$, substantially as set forth.

In testimony whereof I have hereunto set my hand.

Witnesses: JOHN FARRELL.

R. H. WHITTLESEY,

C. L. PARKER.